Feb. 8, 1949.  W. SCHADE  2,461,182
FOUR COMPONENT PHOTOGRAPHIC OBJECTIVE HAVING THE
FIRST TWO CEMENTED SURFACES CONVEX TO THE FRONT
Filed Feb. 9, 1946

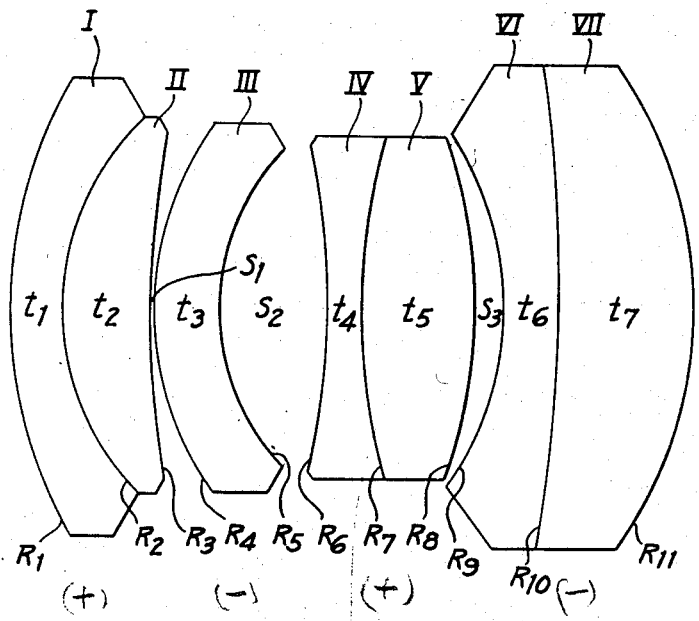

| EF = 100 mm. | | | | f/2.8 | |
|---|---|---|---|---|---|
| LENS | $N_D$ | V | RADII | | THICKNESSES |
| I | 1.617 | 36.6 | $R_1$ = + 43.3mm | $t_1$ = | 4.8 mm |
| II | 1.697 | 56.1 | $R_2$ = + 24.6 | $t_2$ = | 8.2 |
| | | | $R_3$ = + 82.4 | $S_1$ = | 0.2 |
| III | 1.689 | 30.9 | $R_4$ = + 29.0 | $t_3$ = | 6.0 |
| | | | $R_5$ = + 21.4 | $S_2$ = | 10.2 |
| IV | 1.558 | 45.5 | $R_6$ = − 74.5 | $t_4$ = | 3.2 |
| V | 1.734 | 51.1 | $R_7$ = + 61.4 | $t_5$ = | 10.4 |
| | | | $R_8$ = − 47.8 | $S_3$ = | 2.8 |
| VI | 1.572 | 42.5 | $R_9$ = − 28.9 | $t_6$ = | 5.2 |
| VII | 1.572 | 57.4 | $R_{10}$ = −258.0 | $t_7$ = | 12.6 |
| | | | $R_{11}$ = − 38.8 | BF = | 63.5 |

WILLY SCHADE
INVENTOR
BY *Newton M Perrins*
*F M Emerson Holmes*
ATT'Y & AG'T

Patented Feb. 8, 1949

2,461,182

UNITED STATES PATENT OFFICE 2,461,182

FOUR COMPONENT PHOTOGRAPHIC OBJECTIVE HAVING THE FIRST TWO CEMENTED SURFACES CONVEX TO THE FRONT

Willy Schade, Rochester, N. Y., assignor to Eastman Kodak Company, Rochester, N. Y., a corporation of New Jersey Application February 9, 1946, Serial No. 646,685

4 Claims. (Cl. 88—57)

This invention relates to photographic objectives.

The object of this invention is to provide a photographic objective usable at a maximum aperture of about f/2.8 and covering a field of at least ±30° with more highly corrected aberration and correspondingly sharper detail in the image than has been available heretofore.

A known type of objective used heretofore for similar purposes consists of four components as follows: a simple positive meniscus component convex toward the front, a negative meniscus component also convex toward the front and in some instances compound, a meniscus positive component, and a comparatively thick meniscus component of long focal length, the last two components being concave toward the front and enclosing between them an airspace having the shape of a positive meniscus lens, and one of the last two being a simple element whereas the other is compound in these prior lenses.

According to the present invention each of the two positive components consists of a negative element cemented to the front of a positive element whose refractive index is higher by at least 0.04 than that of the negative element. The cemented surface is in each case convex to the front.

It is preferred that the index difference at the cemented surface in the third component be greater than that in the first component and it may advantageously be greater than 0.12. The positive element in each of these two components preferably has a refractive index greater than 1.66 and a dispersive index at least 8% greater than that of the negative lens to which it is cemented.

Each of these features contributes to the high degree of correction of the astigmatism and the curvature of field and thus increases the angular field covered by objectives of this type. At the same time a high degree of correction of the spherical aberration and coma is maintained.

The accompanying drawing shows an objective according to the invention and gives data corresponding thereto. This data is as follows:

F = 100 mm.    f/2.8

| Lens | N | V | Radii | Thicknesses |
|---|---|---|---|---|
| I | 1.617 | 36.6 | $R_1=+43.3$ mm. | $t_1=4.8$ mm. |
| II | 1.697 | 56.1 | $R_2=+24.6$ | $t_2=8.2$ |
|  |  |  | $R_3=+82.4$ | $s_1=0.2$ |
| III | 1.689 | 30.9 | $R_4=+29.0$ | $t_3=6.0$ |
|  |  |  | $R_5=+21.4$ | $s_2=10.2$ |
| IV | 1.558 | 45.5 | $R_6=-74.5$ | $t_4=3.2$ |
| V | 1.734 | 51.1 | $R_7=+61.4$ | $t_5=10.4$ |
|  |  |  | $R_8=-47.8$ | $s_3=2.8$ |
| VI | 1.572 | 42.5 | $R_9=-28.9$ | $t_6=5.2$ |
| VII | 1.572 | 57.4 | $R_{10}=-258$ | $t_7=12.6$ |
|  |  |  | $R_{11}=-38.8$ | $BF=63.5$ |

In this table as well as in the drawing the lens elements are numbered in the first column and the corresponding refractive indices N for the D line of the spectrum and the dispersive indices V are given in the second and third columns. The radii R, thicknesses t, and spaces s, each numbered by subscripts in order from front to rear, are given in the fourth and fifth columns. The back focal length BF is also given. Positive and negative values of the radii indicate surfaces convex and concave respectively to the front, and by "front" is meant the direction of the longer conjugate for which the objective is corrected.

It will be noted that in accordance with the invention the first and third components are positive cemented doublets made up of the negative lens elements I and IV cemented to the front of the positive elements II and V respectively. The cemented surfaces are convex to the front and have radii of curvature $R_2$ and $R_7$ numerically smaller than $R_1$ and $R_6$ respectively. The index differences ($N_{II}-N_I$) and ($N_V-N_{IV}$) are 0.08 and 0.176 respectively, and the dispersive indices are in the ratio $V_{II}=1.53\ V_I$ and $V_V=1.12\ V_{IV}$. It is advantageous that $N_V$ be greater than 1.7.

I have found that superior corrections are obtained by making the first and third components compound in this way rather than two of the rear three as has been done heretofore. The front cemented surface seems to have a better effect on the oblique spherical aberration due to its greater distance from the stop which is at the center of the objective. I have obtained the best results when the concave surface of each of these components has a radius of curvature numerically between 0.4 F and 2 F.

In regard to the second and fourth components of the objective, either or both of these may be compound in order to gain further refinements of detail in the image. In the above example one of them is a simple lens element and the other consists of two elements of substantially the same refractive index but with different dispersions. Lens designers will recognize in this the well known arrangement known as a "buried surface" by which chromatic aberrations may be corrected with available glass types without affecting the monochromatic aberrations. A single element would be equivalent to this doublet shown in the fourth component if some substance with a suitable dispersion were available. Instead of using a buried surface in one or both of these two components, a cemented surface at which there is a substantial difference in refractive index may be used without departing from the spirit of the invention. It may actually be found to be less expensive to make the second component of two elements on account of the special problems of manufacturing a lens element so nearly concentric, as taught in U. S. Patent 2,343,629, Altman.

The rear component should have a focal length numerically greater than 3 F. In the example shown, its focal length is negative and is roughly 6 F.

The astigmatism of the image formed by this objective has been carefully computed at different angles up to 30° from the axis, and is less than 0.0015 F even in the extreme case. Also both astigmatic foci lie within 0.007 F of the theoretical focal plane in each instance.

What I claim is:

1. A photographic objective consisting of four components axially spaced in the following order: a positive meniscus component convex to the front, a negative meniscus component also convex to the front, a positive meniscus component, and a comparatively thick meniscus component of long focal length, the last two components being concave toward the front and enclosing between them an airspace having the shape of a positive meniscus lens, characterized in that each of the two positive components consists of a negative element cemented to the front of a positive element whose index is higher by at least 0.04 than that of the negative element, in that both cemented surfaces are convex to the front, and in that the radius of curvature of the concave surface of each of the two positive components is between two-fifths and two times the focal length of the objective as a whole.

2. An objective as claimed in claim 1 in which the positive element in each of the two positive components has a refractive index greater than 1.66, the index difference within the third component exceeds 0.12, and the focal length of the rear component is numerically greater than three times the focal length of the objective.

3. An objective according to claim 1 in which the focal length of the rear component is numerically greater than three times the focal length of the objective.

4. An objective substantially according to the following specifications:

| Index | Dispersion | Radii | Thicknesses |
|---|---|---|---|
| $N_1=1.62$ | $V_1=37$ | $R_1=+0.4$ F | $t_1=0.05$ F |
| $N_2=1.70$ | $V_2=56$ | $R_2=+0.25$ F | $t_2=0.08$ F |
| Air | | $R_3=+0.8$ F | $s_1<0.01$ F |
| $N_3=1.69$ | $V_3=31$ | $R_4=+0.3$ F | $t_3=0.06$ F |
| | | $R_5=+0.2$ F | $s_2=0.10$ F |
| $N_4=1.56$ | $V_4=46$ | $R_6=-0.7$ F | $t_4=0.03$ F |
| $N_5=1.73$ | $V_5=51$ | $R_7=+0.6$ F | $t_5=0.10$ F |
| | | $R_8=-0.5$ F | $s_3=0.03$ F |
| Air | | $R_9=-0.3$ F | $t_6=0.05$ F |
| $N_6=1.57$ | $V_6\simeq42$ | $R_{10}=-3$ F | $t_7=0.13$ F |
| $N_7=1.57$ | $V_7=57$ | $R_{11}=-0.4$ F | | in which F is the focal length of the objective and N indicates the refractive indices, for the D line of the spectrum, V the dispersive indices, R the radii of curvature of the surfaces, t the axial thicknesses of the lens elements, and s the axial spacing of the components, each numbered by subscripts in order from front to rear, and where the + and − values of the radii indicate surfaces respectively convex and concave to the front.

WILLY SCHADE.

REFERENCES CITED

The following references are of record in the file of this patent:

UNITED STATES PATENTS

| Number | Name | Date |
|---|---|---|
| 1,168,873 | Florian | Jan. 18, 1916 |
| 2,171,640 | Berek | Sept. 5, 1939 |
| 2,336,300 | Schade | Dec. 7, 1943 |
| 2,341,385 | Kingslake | Feb. 8, 1944 |
| 2,397,565 | Schade | Apr. 2, 1946 |